(12) United States Patent
Huang

(10) Patent No.: US 8,358,315 B2
(45) Date of Patent: Jan. 22, 2013

(54) METHOD AND APPARATUS FOR MIRRORING FRAME

(75) Inventor: Li-Chun Huang, Taichung County (TW)

(73) Assignee: Novatek Microelectronics Corp., Hsinchu (TW)

( * ) Notice: Subject to any disclaimer, the term of this patent is extended or adjusted under 35 U.S.C. 154(b) by 484 days.

(21) Appl. No.: 12/553,099

(22) Filed: Sep. 3, 2009

(65) Prior Publication Data

US 2011/0018885 A1 Jan. 27, 2011

(30) Foreign Application Priority Data

Jul. 23, 2009 (TW) .............................. 98124892 A

(51) Int. Cl.
*G09G 5/36* (2006.01)
*G09G 5/10* (2006.01)

(52) U.S. Cl. .......................... 345/560; 345/553; 345/698

(58) Field of Classification Search ........................ None
See application file for complete search history.

(56) References Cited

U.S. PATENT DOCUMENTS

| | | | | |
|---|---|---|---|---|
| 5,745,739 | A * | 4/1998 | Wang et al. | 345/569 |
| 7,587,524 | B2 * | 9/2009 | Cho et al. | 710/22 |
| 7,602,428 | B2 * | 10/2009 | Kondo et al. | 348/297 |
| 7,787,026 | B1 * | 8/2010 | Flory et al. | 348/231.99 |
| 2002/0041631 | A1 * | 4/2002 | Arita et al. | 375/240.16 |
| 2005/0134877 | A1 * | 6/2005 | Kamada | 358/1.9 |

\* cited by examiner

*Primary Examiner* — Hau Nguyen
*Assistant Examiner* — Leon T Cain, II
(74) *Attorney, Agent, or Firm* — Jianq Chyun IP Office

(57) ABSTRACT

A method and an apparatus for mirroring a frame are provided. The method is suitable for a display device having a first storage unit and a second storage unit. In the present method, pixel values of a pixel row of the frame are read from the first storage unit and written into the second storage unit. Then, the pixel values of the pixel row of the frame are read from the second storage unit and written back to the first storage unit. When performing one of foregoing reading and writing steps, the pixel values of the pixel row are read or written in a reverse direction to mirror the pixel row. Finally, foregoing steps are repeated to mirror each pixel row of the frame, so as to mirror the entire frame.

14 Claims, 7 Drawing Sheets

(a)

(b)

METHOD AND APPARATUS FOR MIRRORING FRAME

CROSS-REFERENCE TO RELATED APPLICATION

This application claims the priority benefit of Taiwan application serial no. 98124892, filed Jul. 23, 2009. The entirety of the above-mentioned patent application is hereby incorporated by reference herein and made a part of specification.

BACKGROUND OF THE INVENTION

1. Field of the Invention

The present invention generally relates to a display method and a display apparatus, and more particularly, to a method and an apparatus for mirroring a frame.

2. Description of Related Art

When displaying a frame, a display system usually needs to rotate or horizontally mirror the frame according to various display requirements. Such a rotating or mirroring action may be accomplished through a host by updating data stored in a memory thereof. However, such a technique will increase the number of times that the host accesses the memory. In order to reduce the workload and accordingly improve the performance of the host, this kind of mirroring actions is usually carried out by a peripheral apparatus (for example, a display).

FIG. 1 illustrates a display device with a memory that is capable of mirroring a frame independently. Referring to FIG. 1, when the display device 100 is about to mirror a frame, a controller 110 reads frame data from the memory 120, wherein the frame data is previously written into the memory 120 by a host. Then, the controller 110 determines whether to send the frame data into the shift register 150 from left or right, so as to mirror the frame, by controlling the on and off of a line latch 140 in a source driver 130. However, if this technique is adopted, the line latch 140 and the shift register 150 have to be additionally disposed, and accordingly the fabricating cost of the display device 100 is increased.

FIG. 2 illustrates another display device capable of mirroring a frame. Referring to FIG. 2, in the display device 200, the controller 210 controls the memory 220 to send the frame data directly into the line latch 240 in the source driver 230 through the data bus 250. Since the controller 210 does not need to relay the data, the time and power consumed by the controller 210 for reading the frame data from the memory 220 are both spared. However, because the frame mirroring action needs to swap the data at the left portion and the data at the right portion of the frame, many wires have to be disposed so as to add the lines for swapping data to the foregoing structure of display device, which is difficult to be realized.

SUMMARY OF THE INVENTION

Accordingly, the present invention is directed to a method for mirroring a frame, wherein when accessing a pixel row of the frame, the pixel row is read or written in a reverse direction, so as to mirror the frame.

The present invention is directed to an apparatus for mirroring a frame, wherein additional storage units are disposed for temporarily storing pixel data, and the frame is mirrored by means of reading or writing the pixel data in a reverse direction, or by adjusting a display range of the frame.

The present invention provides a frame mirroring method suitable for a display device having a first storage unit and a second storage unit. In the present method, the pixel values of a pixel row of a frame are read from the first storage unit and written into the second storage unit. Then, the pixel values of the pixel row are read from the second storage unit and written back to the first storage unit. When performing one of foregoing reading and writing steps, the pixel values of the pixel row are read or written in a reverse direction, so as to mirror the pixel row. Finally, foregoing steps are repeated to mirror each pixel row of the frame, so as to mirror the entire frame.

According to an embodiment of the present invention, the second storage unit is a data line in the first storage unit, and the length of the data line is equal to the width of the frame.

According to an embodiment of the present invention, the second storage unit is a controller disposed in the display device. In the frame mirroring method, the pixel values of two bilaterally symmetrical pixels in the pixel row of the frame are read from the first storage unit and written into the second storage unit. Then, the pixel values of the two pixels in the pixel row are read from the second storage unit and written back to the first storage unit. When performing one of foregoing reading and writing steps, the pixel values of the two pixels in the pixel row are read or written in a reverse direction, so as to swap the two pixels. Finally, foregoing steps are repeated to swap all the bilaterally symmetrical pixels in the pixel row, so as to mirror the pixel values of the pixel row.

According to an embodiment of the present invention, the step of reading the pixel values of the pixel row includes reading the pixel values from left to right or from right to left, and the step of writing the pixel values of the pixel row includes writing the pixel values from left to right or from right to left.

The present invention provides a frame mirroring method suitable for a display device having a first storage unit and a second storage unit. In the present method, the pixel values of a pixel row of a frame are read from the first storage unit and written into the second storage unit. Then, the pixel values of an adjacent pixel row are read and written into the pixel row to overwrite the pixel values of the pixel row. Foregoing steps are repeated to sequentially read and write each pixel row of the frame. When performing one of the reading and writing steps of each of the pixel rows, the pixel values of the pixel row are read or written in a reverse direction, so as to mirror the pixel row. Finally, an output range of the frame is adjusted as a range in which the mirrored pixel rows are located.

According to an embodiment of the present invention, the second storage unit is a data line in the first storage unit, and the length of the data line is equal to the width of the frame.

According to an embodiment of the present invention, in the step of reading the pixel values of the pixel row of the frame from the first storage unit and writing the pixel values into the second storage unit, the pixel row is an upper edge pixel row or a lower edge pixel row of the frame.

The present invention provides a frame mirroring apparatus including a first storage unit, a second storage unit, and a control unit. The first storage unit stores a frame written by a host. The control unit is coupled to the first storage unit and the second storage unit. The control unit reads the pixel values of a pixel row of the frame from the first storage unit and writes the pixel values into the second storage unit. Then, the control unit reads the pixel values of the pixel row from the second storage unit and writes the pixel values back to the first storage unit. When performing one of foregoing reading and writing steps, the control unit reads or writes the pixel values of the pixel row in a reverse direction so as to mirror the pixel row. Finally, the control unit repeats foregoing steps to mirror each pixel row of the frame, so as to mirror the entire frame.

According to an embodiment of the present invention, the control unit reads the pixel values of two bilaterally symmetrical pixels in the pixel row of the frame from the first storage unit and writes the pixel values into the second storage unit. Then, the control unit reads the pixel values of the two pixels in the pixel row from the second storage unit and writes the pixel values back to the first storage unit. When performing one of foregoing reading and writing steps, the control units reads or writes the pixel values of the two pixels in the pixel row in a reverse direction, so as to swap the two pixels. Finally, the control unit repeats foregoing steps to swap all the bilaterally symmetrical pixels in the pixel row, so as to mirror the pixel values of the pixel row.

The present invention provides a frame mirroring apparatus including a first storage unit, a second storage unit, and a control unit. The first storage unit stores a frame written by a host. The control unit is coupled to the first storage unit and the second storage unit. The control unit reads the pixel values of a pixel row of the frame from the first storage unit and writes the pixel values into the second storage unit. Then, the control unit reads the pixel values of an adjacent pixel row and writes the pixel values into the pixel row to overwrite the pixel values of the pixel row. The control unit repeats foregoing steps to sequentially read and write each of the pixel rows of the frame. When performing one of the reading and writing steps of each of the pixel rows, the control unit reads or writes the pixel values of the pixel row in a reverse direction, so as to mirror the pixel row. Finally, the control unit adjusts an output range of the frame as a range in which the mirrored pixel rows are located.

As described above, the present invention provides a method and an apparatus for mirroring a frame, wherein an additional data line is disposed in a memory or a controller of a display device for temporarily storing the frame data of a pixel row, and the frame is mirrored by reading or writing the pixel row in a reverse direction, or by adjusting a display range of the frame.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
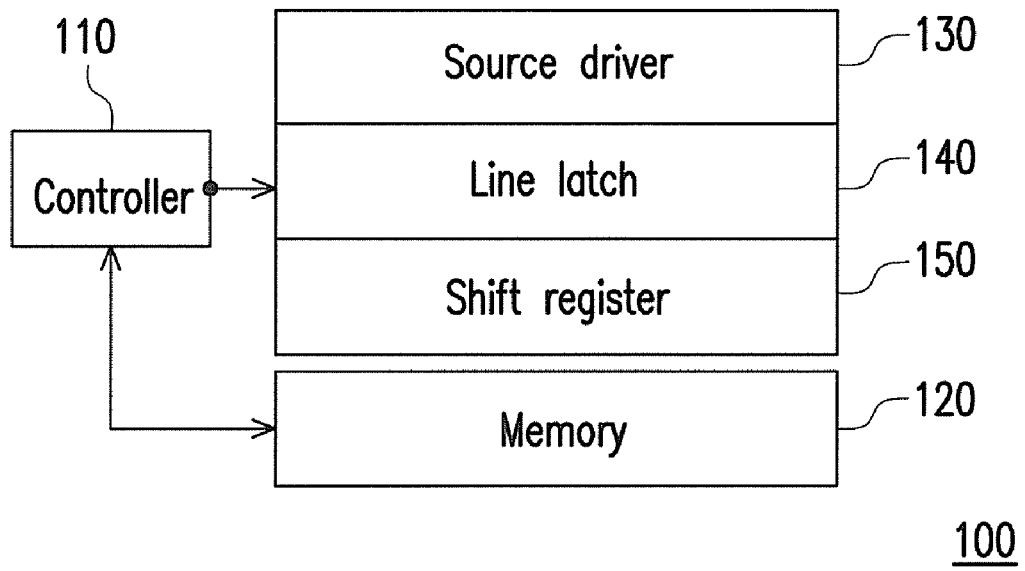
FIG. 1 illustrates the structure of a conventional display device.
Figure 2:
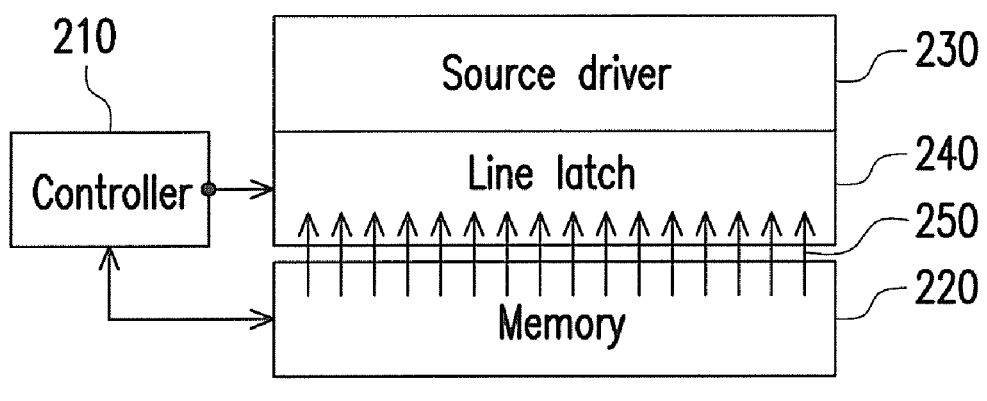
FIG. 2 illustrates the structure of a conventional display device.

Reference will now be made in detail to the present preferred embodiments of the invention, examples of which are illustrated in the accompanying drawings. Wherever possible, the same reference numbers are used in the drawings and the description to refer to the same or like parts.

According to the present invention, a data line or two registers are additionally disposed in a memory or a controller of a display device for temporarily storing data, and a frame is mirrored by moving the data thereof from a display area to the temporary area and then moving back to the display area, and meanwhile, reading or writing the data in a reverse direction. In addition, according to the present invention, pixel rows of a frame are sequentially moved to the adjacent pixel rows by reading or writing the pixel rows in a reverse direction, or adjusting a display range of the frame, so as to mirror the frame. Below, embodiments of the present invention will be described in detail with reference to accompanying drawings.

Figure 3:
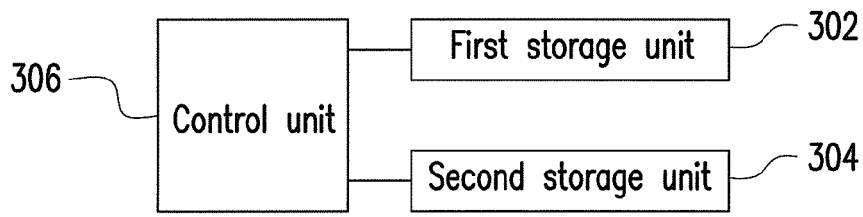
FIG. 3 is a block diagram of a frame mirroring apparatus according to a first embodiment of the present invention.
Figure 4:
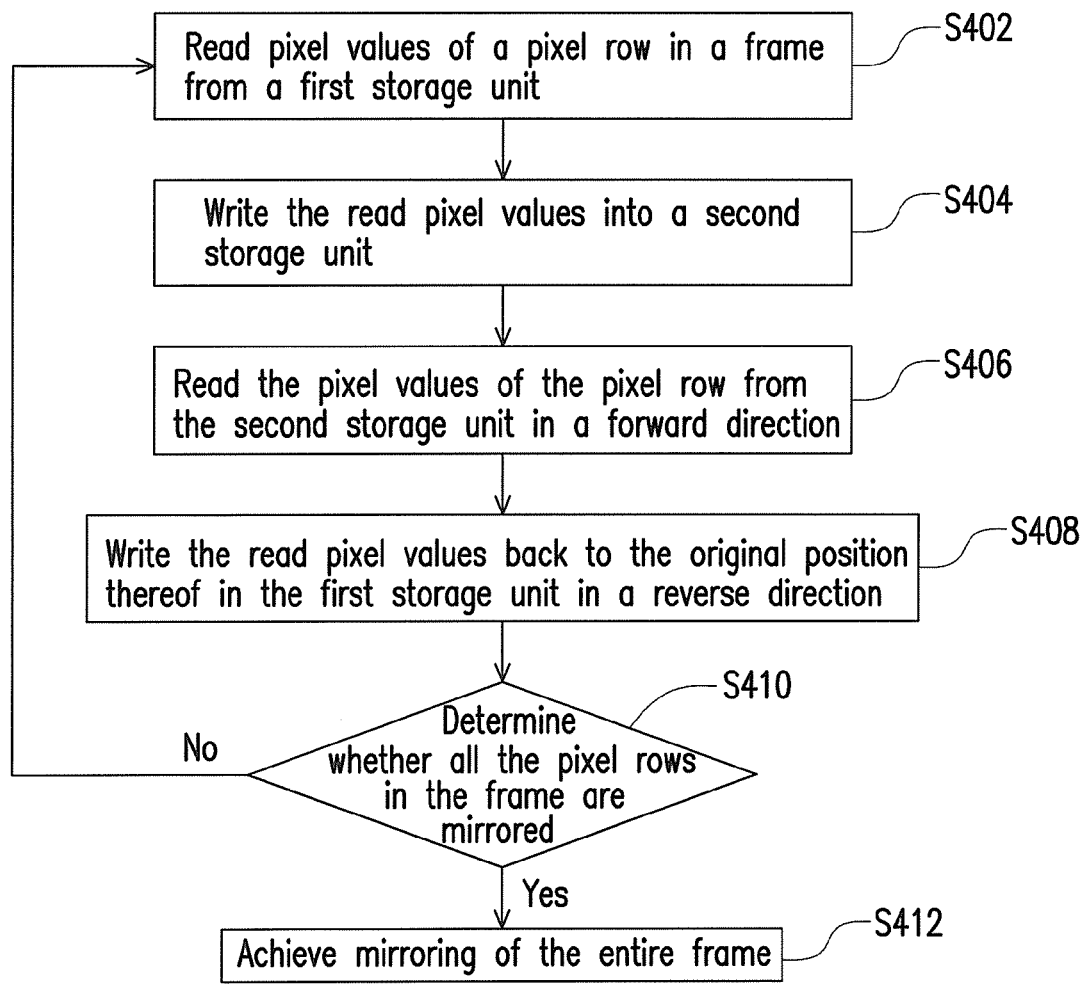
FIG. 4 is a flowchart of a frame mirroring method according to the first embodiment of the present invention.

FIG. 3 is a block diagram of a frame mirroring apparatus according to a first embodiment of the present invention. FIG. 4 is a flowchart of a frame mirroring method according to the first embodiment of the present invention. Referring to both FIG. 3 and FIG. 4, in the present embodiment, the frame mirroring apparatus 300 is suitable for being disposed in a display device, such as a liquid crystal display (LCD). The frame mirroring apparatus 300 includes a first storage unit 302, a second storage unit 304, and a control unit 306. The first storage unit 302 is used for storing frame data written by a host. The second storage unit 304 is used for temporarily storing data. The second storage unit 304 may be a data line in a memory, and the length of the data line is equal to the width of the frame so that it can store the data of a pixel row in the frame. The steps in the present frame mirroring method will be respectively described below.

First, the control unit 306 reads the pixel values of a pixel row of the frame from the first storage unit 302 (step S402) and writes the read pixel values into the second storage unit 304 (step S404), so as to move the pixel values of the pixel row to the second storage unit 304. When the control unit 306 executes foregoing reading and writing steps, the control unit 306 reads and writes the pixel values in a forward direction. Accordingly, the data of the pixel row moved to the second storage unit 304 is identical to the data of the pixel row stored in the first storage unit 302.

Next, the control unit 306 reads the pixel values of the pixel row from the second storage unit 304 in the forward direction (step S406) and then writes the read pixel values back to the original position in the first storage unit 302 in a reverse direction (step S408), so as to mirror the pixel row.

Figure 5:
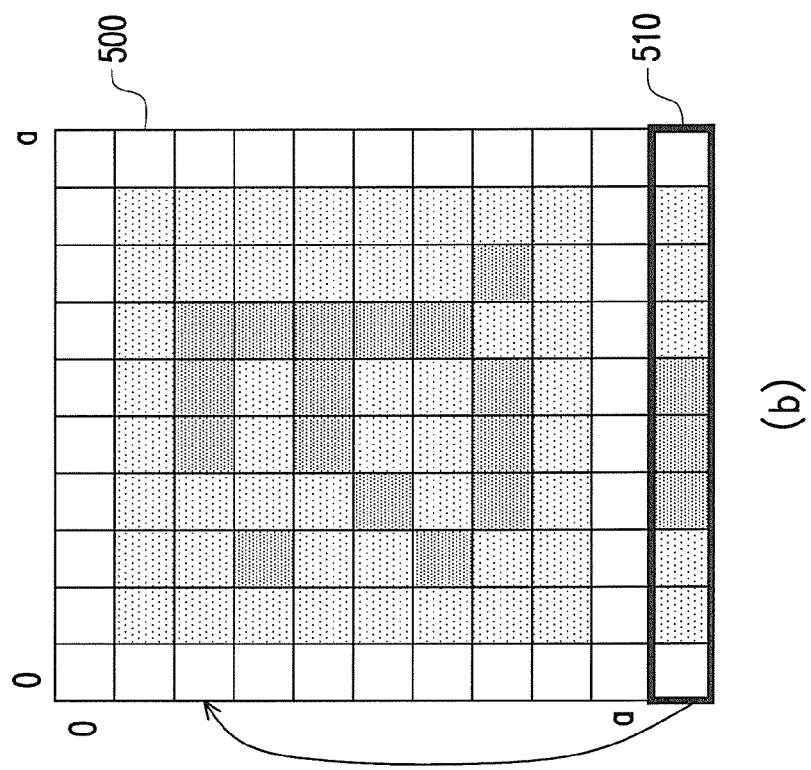
FIG. 5(a) and FIG. 5(b) illustrate an example of mirroring a frame according to the first embodiment of the present invention.
Figure 5:
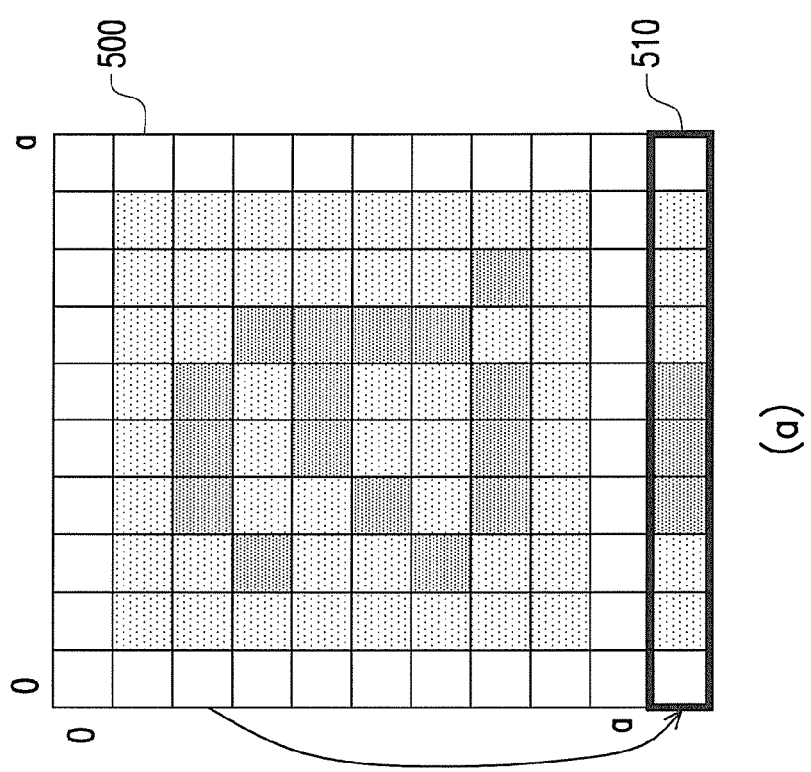

FIG. 5(a) and FIG. 5(b) illustrate an example of mirroring a frame according to the first embodiment of the present invention. First, referring to FIG. 5(a), in the present example, a data line 510 is disposed in the memory 500 for temporarily storing data of a pixel row read from the memory 500. If the pixel values of the pixel row at addresses 02~a2 in the memory 500 are sequentially read from left to right and written into the data line 510 from left to right, the pixel row in the data line 510 is identical to the pixel row at the addresses 02~a2 in the memory 500. Next, referring to FIG. 5(b), if the pixel values of the pixel row in the data line 510 is sequentially read from left to right and then written back to the original addresses (i.e., 02~a2) in the memory 500 from right to left, the pixel row is mirrored.

After mirroring the pixel row, the control unit 306 determines whether all the pixel rows of the frame are mirrored (step S410). If there is still a pixel row of the frame to be mirrored, step S402 is executed again to mirror the next pixel row. Otherwise, if all the pixel rows of the frame have been mirrored, the mirroring of the entire frame is accomplished (step S412).

Through the technique described above, a frame can be horizontally flipped without using any shift register or updating the memory through a host, so that the hardware cost of the display device is reduced.

It should be mentioned that, in the present embodiment, a frame is mirrored by reading pixel values from the second storage unit 304 in a forward direction and then writing the pixel values back to the first storage unit 302 in a reverse direction. However, the present invention is not limited thereto. In other embodiments of the present invention, the control unit 306 may also reads the pixel values from the first storage unit 302 in the forward direction and then writes the pixel values into the second storage unit 304 in the reverse direction, or reads the pixel values from the first storage unit 302 in the reverse direction and then writes the pixel values into the second storage unit 304 in the forward direction, or reads the pixel values from the second storage unit 304 in the reverse direction and then writes the pixel values back to the first storage unit 302 in the forward direction to mirror a frame. In short, according to the present invention, a frame can be mirrored as long as one reverse reading action or one reverse writing action is performed during the process of moving the pixel values of the pixel rows in the frame.

Figures 6, 7:
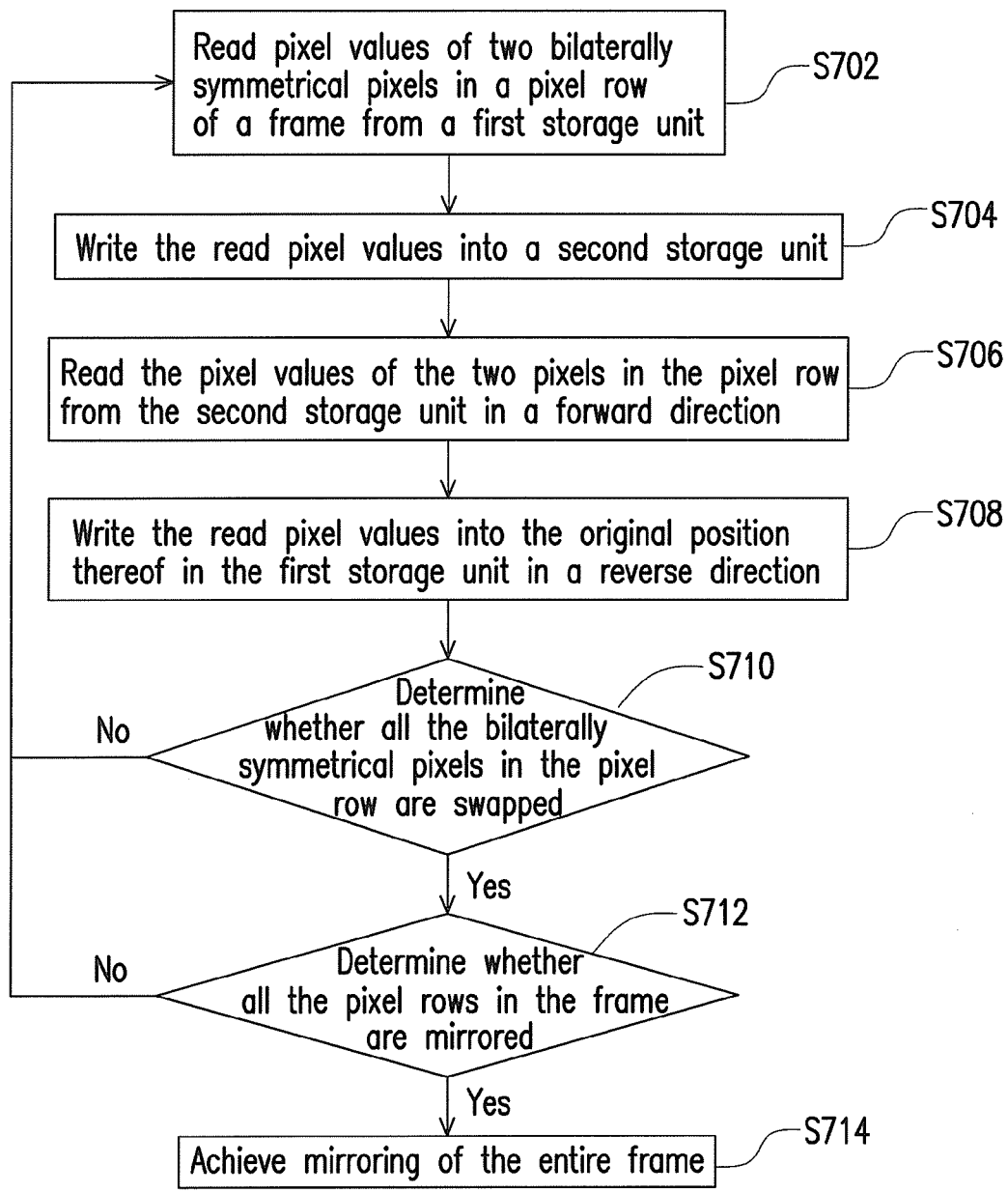
FIG. 6 is a block diagram of a frame mirroring apparatus according to a second embodiment of the present invention.
FIG. 7 is a flowchart of a frame mirroring method according to the second embodiment of the present invention.

FIG. 6 is a block diagram of a frame mirroring apparatus according to a second embodiment of the present invention. FIG. 7 is a flowchart of a frame mirroring method according to the second embodiment of the present invention. Referring to both FIG. 6 and FIG. 7, in the present embodiment, the frame mirroring apparatus 600 is suitable for being disposed in a display device, such as a LCD. The frame mirroring apparatus 600 includes a first storage unit 602, a second storage unit 604, and a control unit 606. The first storage unit 602 is used for storing frame data written by a host, and the second storage unit 604 may be two registers disposed in the control unit 606 and used for storing the pixel values of two pixels. The steps in the present frame mirroring method will be respectively described below.

First, the control unit 606 reads the pixel values of two bilaterally symmetrical pixels in a pixel row of a frame from the first storage unit 602 (step S702) and writes the pixel values into the second storage unit 604 (step S704), so as to move the pixel values of these two pixels into the second storage unit 604. While reading and writing the pixel values, the control unit 606 reads and writes the pixel values in a forward direction so that the pixel values written into the second storage unit 604 are identical to the pixel values stored in the first storage unit 602.

Then, the control unit 606 reads the pixel values of the two pixels from the second storage unit 604 in the forward direction (step S706) and writes the pixel values back to the original position in the first storage unit 602 in a reverse direction (step S708), so as to swap these two pixels.

After swapping a pair of bilaterally symmetrical pixels, the control unit 606 determines whether all the bilaterally symmetrical pixels in the pixel row are swapped (step S710). If there is still pixels in the pixel row to be swapped, step S702 is executed again to swap the next pair of bilaterally symmetrical pixels.

On the other hand, similar to the technique described in the first embodiment, in the present embodiment, after all the bilaterally symmetrical pixels in a pixel row are swapped, the control unit 606 further determines whether all the pixel rows in the frame are mirrored (step S712). If there is still a pixel row of the frame to be mirrored, step S702 is executed again to mirror the next pixel row. Otherwise, if all the pixel rows of the frame have been mirrored, the mirroring of the entire frame is accomplished (step S714).

Figure 8:
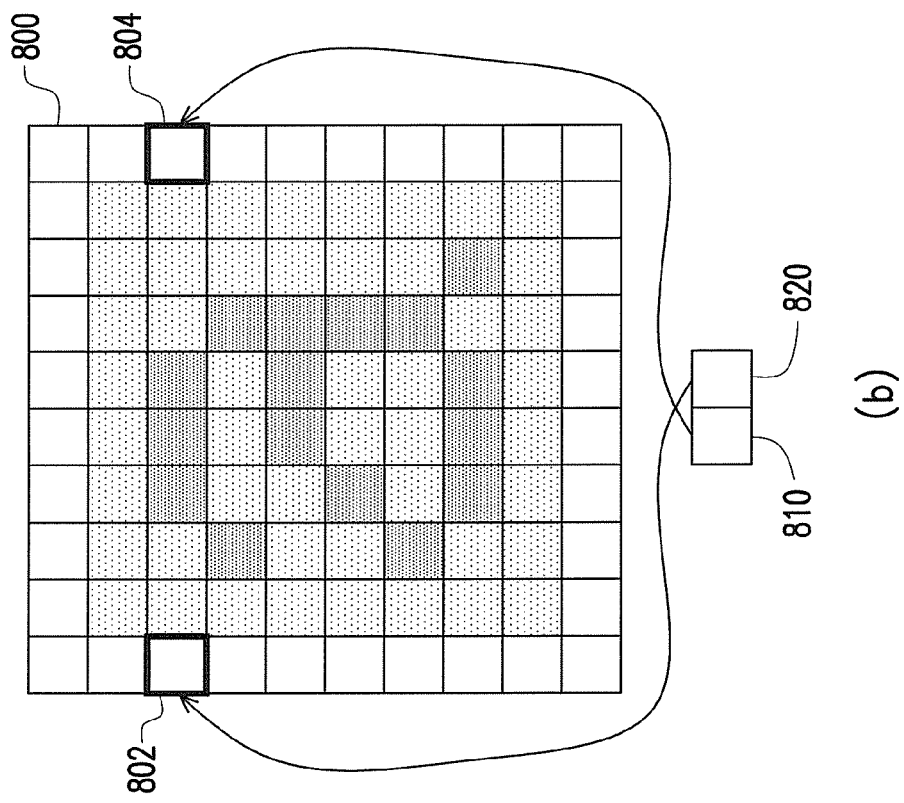
FIG. 8(a) and FIG. 8(b) illustrate an example of mirroring a frame according to the second embodiment of the present invention.
Figure 8:
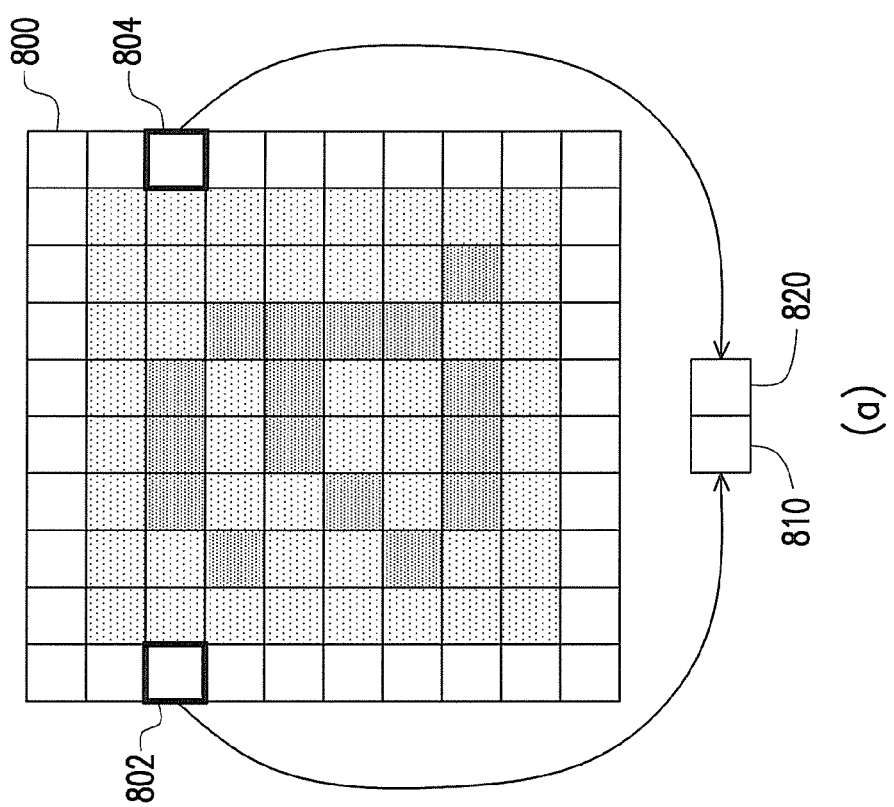

FIG. 8(a) and FIG. 8(b) illustrate an example of mirroring a frame according to the second embodiment of the present invention. First, referring to FIG. 8(a), in the present example, two registers 810 and 820 are disposed outside the memory 800 (for example, in a controller) for temporarily storing the pixel values of two bilaterally symmetrical pixels read from the memory 800. If the pixel values of the bilaterally symmetrical pixels 802 and 804 in the memory 800 are read in a forward direction and then written into the registers 810 and 820 also in the forward direction, the pixel values in the registers 810 and 820 are identical to the pixel values of the bilaterally symmetrical pixels 802 and 804 in the memory 800. Next, referring to FIG. 8(b), if the pixel values in the registers 810 and 820 are read in the forward direction and then written back to the original position (i.e., the bilaterally symmetrical pixels 802 and 804) in the memory 800 in a reverse direction, the mirroring of the bilaterally symmetrical pixels 802 and 804 is accomplished.

Through the technique described above, a frame can be mirrored by using a small quantity of storage space (two registers), and accordingly the hardware cost of the display device is reduced. Besides, as described in the first embodiment, in the present embodiment, a frame is mirrored by reading pixel values from the second storage unit 604 in a forward direction and then writing the pixel values back to the first storage unit 602 in a reverse direction. However, the present invention is not limited thereto. In other embodiments of the present invention, the control unit 606 may also reads the pixel values from the first storage unit 602 in the forward direction and then writes the pixel values back to the second storage unit 604 in the reverse direction, or reads the pixel values from the first storage unit 602 in the reverse direction and then writes the pixel values back to the second storage unit 604 in the forward direction, or reads the pixel values from the second storage unit 604 in the reverse direction and then writes the pixel values back to the first storage unit 602 in the forward direction, so as to mirror the frame. In short, according to the present invention, a frame can be mirrored as long as one reverse reading action or one reversing writing action is performed during the process of moving the pixel values of the bilaterally symmetrical pixels.

Figure 9:
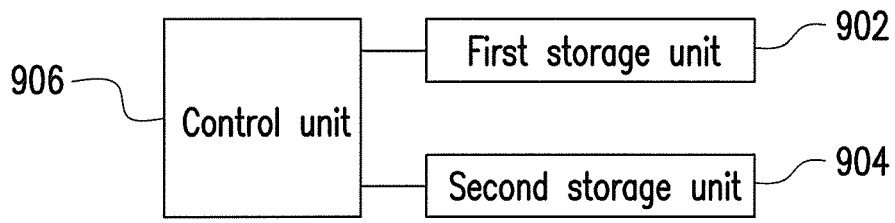
FIG. 9 is a block diagram of a frame mirroring apparatus according to a third embodiment of the present invention.
Figure 10:
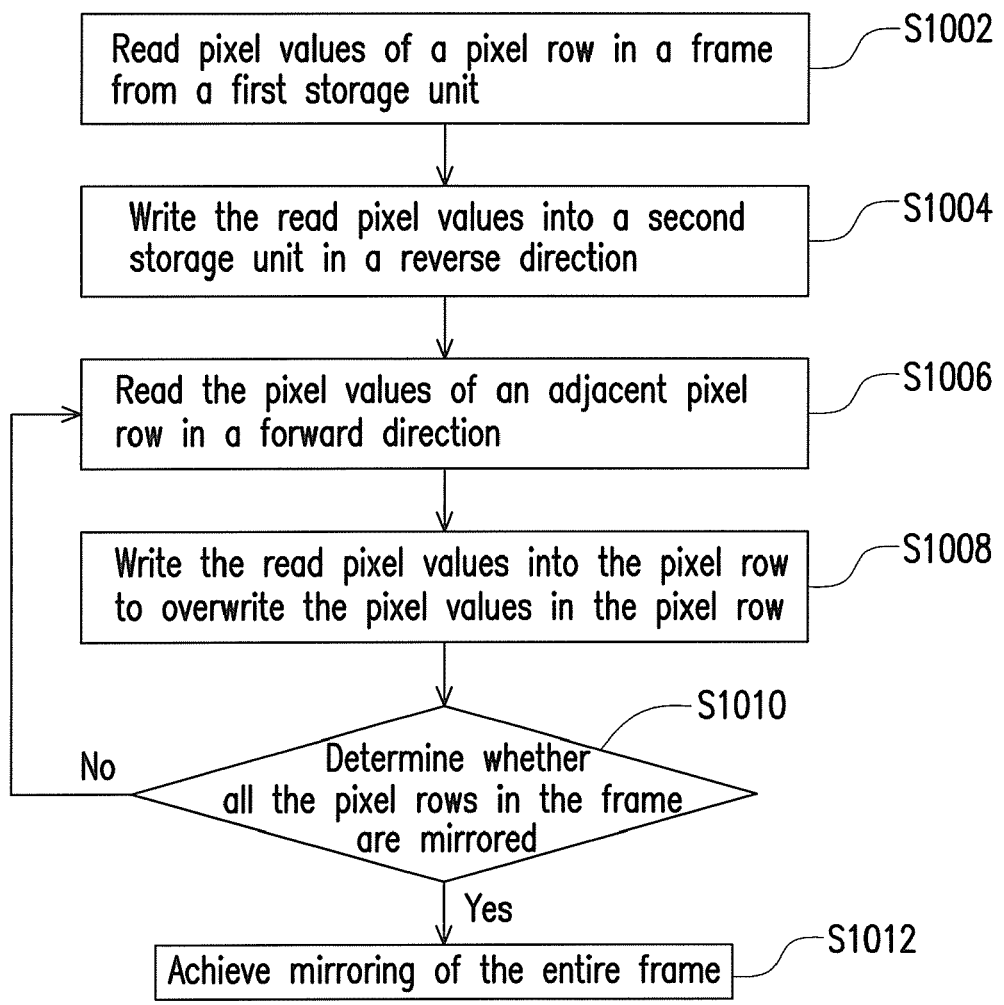
FIG. 10 is a flowchart of a frame mirroring method according to the third embodiment of the present invention.

FIG. 9 is a block diagram of a frame mirroring apparatus according to a third embodiment of the present invention. FIG. 10 is a flowchart of a frame mirroring method according to the third embodiment of the present invention. Referring to both FIG. 9 and FIG. 10, in the present embodiment, the frame mirroring apparatus 900 is suitable for being disposed in a display device, such as a LCD. The frame mirroring apparatus 900 includes a first storage unit 902, a second storage unit 904, and a control unit 906. The first storage unit 902 is used for storing frame data written by a host. The second storage unit 904 is used for temporarily storing data. The second storage unit 904 may be a data line in the memory, and the length of the data line is equal to the width of the frame so that it can store the pixel values of a pixel row of the frame. The steps in the present frame mirroring method will be respectively described below.

First, the control unit 906 reads the pixel values of a pixel row of a frame from the first storage unit 902 in a forward direction (step S1002) and then writes the pixel values into the second storage unit 904 in a reverse direction (step S1004), so as to move the pixel values of the pixel row to the second storage unit 904 and mirror the pixel row.

Unlike the first embodiment, in the present embodiment, all the pixel rows of the original frame are shifted upwards or downwards by one pixel row so that the pixel values of these pixel rows can be mirrored in the shifting of the pixel rows, so as to mirror the entire frame. Thus, in step S1002, the pixel row read by the control unit 906 is a lower edge pixel row or an upper edge pixel row of the original frame, and the pixel values stored in the second storage unit 904 are pixel values of the lower edge pixel row or the upper edge pixel row in the original frame.

Next, the control unit 906 reads the pixel values of an adjacent pixel row in the forward direction (step S1006) and then writes the pixels values into the pixel row in the reverse direction to overwrite the pixel values in the pixel row (step S1008), so that the adjacent pixel row is mirrored and shifted.

After shifting and mirroring a pixel row, the control unit 906 determines whether all the pixel rows of the frame are mirrored (step S1010). If there is still a pixel row to be mirrored, step S1006 is executed again to mirror a next pixel row. Otherwise, if all the pixel rows of the frame have been mirrored, the mirroring of the entire frame is accomplished (step S1012). In short, after mirroring and shifting a pixel row, the control unit 906 continues to read the pixel values of an adjacent pixel row and overwrites the pixel values of the pixel row, so that the pixel values of each pixel row of the frame can be shifted upwards or downwards and stored after the pixel row is mirrored.

After mirroring and shifting all the pixel rows, the control unit 906 adjusts an output range of the frame as a range in which the mirrored pixel rows are located (step S1014), so as to correspond the output frame to the original frame. In short, the control unit 906 shifts the output range upwards or downwards according to whether the pixel rows are shifted upwards or downwards, so as to make the final displayed frame be identical to the mirrored frame of the original frame.

Figure 11:
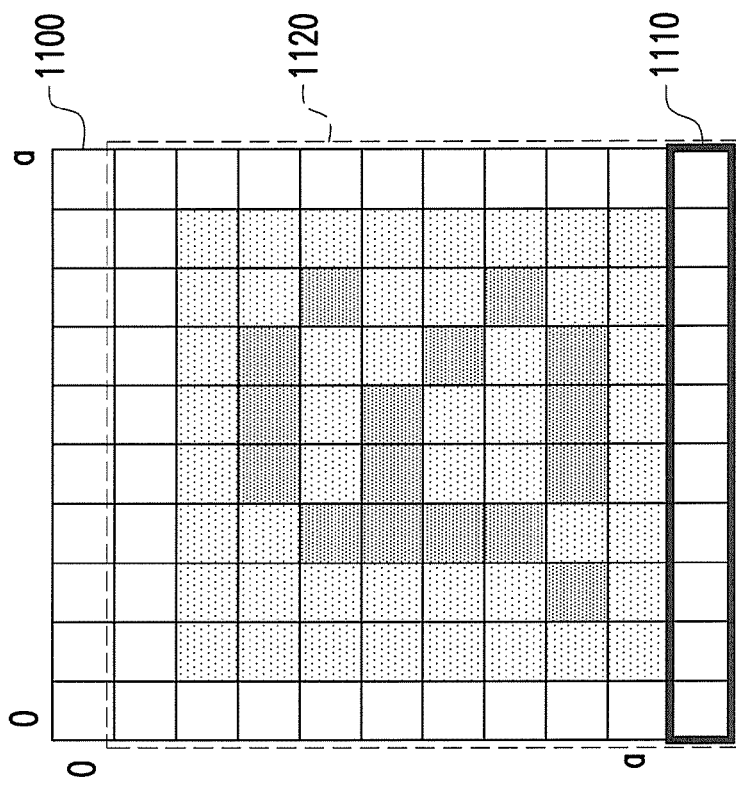
FIG. 11(a) and FIG. 11(b) illustrate an example of mirroring a frame according to the third embodiment of the present invention.
Figure 11:
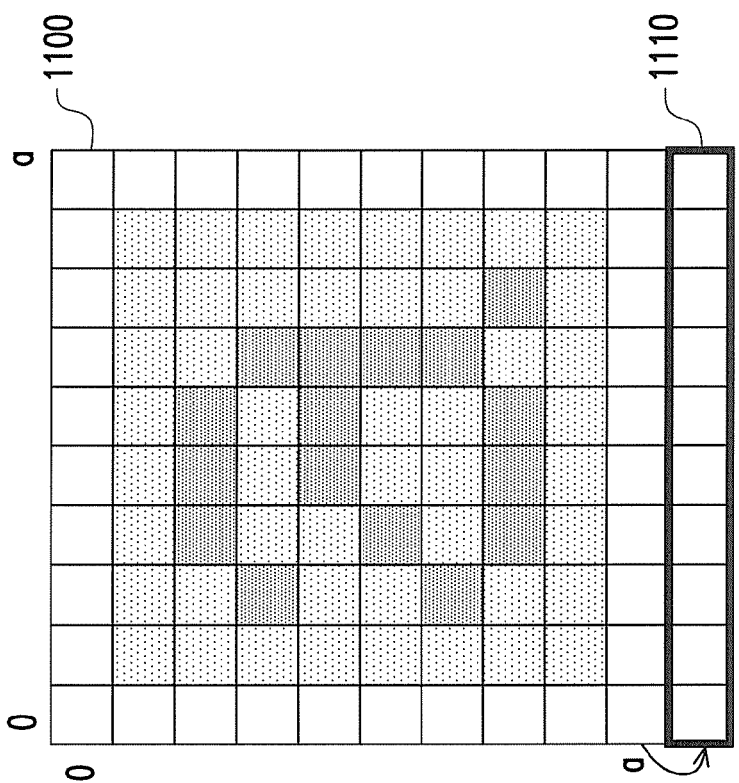

FIG. 11(a) and FIG. 11(b) illustrate an example of mirroring a frame according to the third embodiment of the present invention. Referring to FIG. 11(a), in the present example, an additional data line 1110 is disposed in the memory 1100 for temporarily storing data read from the memory 1100. If the pixel values of the pixel row at the addresses 0a~aa in the memory 1100 are sequentially read from left to right and then written into the data line 1110 from right to left, the mirroring of the pixel row at the addresses 0a~aa is accomplished. Similarly, the pixel values of the pixel row at the addresses 09~a9 in the memory 1100 are sequentially read from left to right and then written to the pixel row at the addresses 0a~aa from right to left, the mirroring of the pixel row at the addresses 09~a9 is accomplished. Accordingly, the mirroring of the entire frame can be accomplished (as shown in FIG. 11(b)). After mirroring and shifting the pixel rows, a display range 1120 of the frame is set as a range in which the mirrored and shifted pixel rows are located, so as to correspond the output frame to the original frame.

If the technique in the present embodiment is adopted, a frame can be mirrored through only one reading action and one writing action. Accordingly, compared to the techniques in the first and the second embodiment, the access time is cut in half. Besides, since no shift register is required, the hardware cost of the display device is reduced.

It should be mentioned that in the present embodiment, a frame is mirrored by reading pixel values in the forward direction and then writing the pixel values in the reverse direction. However, the present invention is not limited thereto, and in other embodiments of the present invention, the control unit 306 may also mirror a frame by reading the pixel values in the reverse direction and then writing the pixel values in the forward direction.

As described above, the present invention provides a method and an apparatus for mirroring a frame, wherein the pixel values of a pixel row are read from a memory and then written back to the memory, and when the pixel values of the pixel row are accessed, the pixel values are read or written in a reverse direction, so as to mirror the frame. According to the present invention, a frame may also be mirrored by shifting the pixel values of pixel rows of the frame in the memory, wherein when the pixel values of the pixel rows are shifted, the pixel values are read or written in a reverse direction. Thereby, according to the present invention, no additional line latch or shift register is needed, and accordingly the hardware cost is reduced.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A frame mirroring method, suitable for a display device comprising a first storage unit and a second storage unit, the frame mirroring method comprising:

reading pixel values of two pixels in a pixel row of a frame from the first storage unit, and writing the read pixel values into the second storage unit, wherein the second storage unit are two registers, one of the two pixels is located at $i^{th}$ position of the pixel row, the other one of the two pixels is located at $(w+1-i)^{th}$ position of the pixel row, and w are positive integers and w is a width of the pixel row;

reading the pixel values of the two pixels in the pixel row from the second storage unit and writing the read pixel values back to the first storage unit, wherein when performing one of foregoing reading and writing steps, the pixel values of the two pixels in the pixel row are read or written in a reverse direction, so as to swap the two pixels; and repeating foregoing steps to swap all pixels in the frame, so as to mirror the frame.

2. The frame mirroring method according to claim 1, wherein the step of reading the pixel values of the two pixels in the pixel row comprises reading the pixel values from left to right or from right to left.

3. The frame mirroring method according to claim 1, wherein the step of writing the pixel values of the two pixels in the pixel row comprises writing the pixel values from left to right or from right to left.

4. A frame mirroring method, suitable for a display device comprising a first storage unit and a second storage unit, the frame mirroring method comprising:

reading pixel values of a pixel row of a frame from the first storage unit, and writing the read pixel values into the second storage unit, wherein the second storage unit is a data line in the first storage unit, and a length of the data line is equal to a width of the frame;

reading pixel values of an adjacent pixel row next to the pixel row, and writing the read pixel values into the pixel row to overwrite the pixel values of the pixel row;

repeating foregoing steps to sequentially read and write each pixel row of the frame, wherein when performing one of the reading and writing steps of each of the pixel rows, the pixel values of the pixel row are read or written in a reverse direction, so as to mirror the pixel row; and adjusting an output range of the frame as a range in which the mirrored pixel rows are located.

5. The frame mirroring method according to claim 4, wherein in the step of reading the pixel values of the pixel row of the frame from the first storage unit and writing the read pixel values into the second storage unit, the pixel row is an upper edge pixel row or a lower edge pixel row of the frame.

6. The frame mirroring method according to claim 4, wherein the step of reading the pixel values of the pixel row comprises reading the pixel values from left to right or from right to left.

7. The frame mirroring method according to claim 4, wherein the step of writing the pixel values of the pixel row comprises writing the pixel values from left to right or from right to left.

8. A frame mirroring apparatus, comprising:
a first storage unit, for storing data of a frame written by a host;
a second storage unit;
a control unit, coupled to the first storage unit and the second storage unit, for reading pixel values of two pixels in a pixel row of the frame from the first storage unit and writing the read pixel values into the second storage unit, wherein the second storage unit are two registers, one of the two pixels is located at $i^{th}$ position of the pixel row, the other one of the two pixels is located at $(w+1-i)^{th}$ position of the pixel row, i and w are positive integers and w is a width of the pixel row,
wherein the control unit is further configured for reading the pixel values of the two pixels in the pixel row from the second storage unit and writing the read pixel values back to the first storage unit, wherein when performing one of foregoing reading and writing steps, the control unit reads or writes the pixel values of the two pixels in the pixel row in a reverse direction, so as to swap the two pixels, and the control unit repeats foregoing steps to swap all pixels in the frame, so as to mirror the entire frame.

9. The frame mirroring apparatus according to claim 8, wherein the control unit reads the pixel values of the two pixels in the pixel row from left to right or from right to left.

10. The frame mirroring apparatus according to claim 8, wherein the control unit writes the pixel values of the two pixels in the pixel row from left to right or from right to left.

11. A frame mirroring apparatus, comprising:
a first storage unit, for storing data of a frame written by a host;
a second storage unit;
a control unit, coupled to the first storage unit and the second storage unit, for reading pixel values of a pixel row of the frame from the first storage unit and writing the read pixel values into the second storage unit, wherein the second storage unit is a data line in the first storage unit, and a length of the data line is equal to a width of the frame,
wherein the control unit is further configured for reading pixel values of an adjacent pixel row next to the pixel row and writing the read pixel values into the pixel row to overwrite the pixel values of the pixel row, and repeating foregoing steps to sequentially read and write each pixel row of the frame, wherein when performing one of the reading and writing steps of each of the pixel rows, the control unit reads or writes the pixel values of the pixel row in a reverse direction, so as to mirror the pixel row, and the control unit adjusts an output range of the frame as a range in which the mirrored pixel rows are located.

12. The frame mirroring apparatus according to claim 11, wherein when the control unit reads the pixel values of the pixel row of the frame from the first storage unit and writes the read pixels values into the second storage unit, the pixel row is an upper edge pixel row or a lower edge pixel row of the frame.

13. The frame mirroring apparatus according to claim 11, wherein the control unit reads the pixel values of the pixel row from left to right or from right to left.

14. The frame mirroring apparatus according to claim 11, wherein the control unit writes the pixel values of the pixel row from left to right or from right to left.

* * * * *